US011891225B2

(12) United States Patent
Liu et al.

(10) Patent No.: US 11,891,225 B2
(45) Date of Patent: Feb. 6, 2024

(54) BOX WRAP SECURITY DEVICE

(71) Applicant: GMT INTELLIGENT ELECTRONIC TECHNOLOGY (KUNSHAN) CO., LTD., Kunshan (CN)

(72) Inventors: Mingxia Liu, Kunshan (CN); Yanwen Liu, Kunshan (CN)

(73) Assignee: GMT INTELLIGENT ELECTRONIC TECHNOLOGY (KUNSHAN) CO., LTD., Kunshan (CN)

( * ) Notice: Subject to any disclaimer, the term of this patent is extended or adjusted under 35 U.S.C. 154(b) by 671 days.

(21) Appl. No.: 16/870,915

(22) Filed: May 9, 2020

(65) Prior Publication Data

US 2021/0347542 A1 Nov. 11, 2021

(51) Int. Cl.
*B65D 55/04* (2006.01)
*B65D 55/14* (2006.01)
(Continued)

(52) U.S. Cl.
CPC ............. *B65D 55/04* (2013.01); *B65D 55/14* (2013.01); *G08B 13/126* (2013.01); *B65D 2211/00* (2013.01); *B65D 2401/00* (2020.05)

(58) Field of Classification Search
USPC .... 206/459.1, 262, 264, 268, 271, 273, 277, 206/278, 281, 303, 305, 307, 308.1, 206/308.2, 308.3, 309, 312, 315.1, 315.2, 206/315.3, 317, 320, 326, 335, 346, 347, 206/348, 349, 354, 362.1, 363, 364, 365, 206/366, 370, 371, 372, 373, 375, 376, 206/378, 380, 382, 383, 387.11, 387.13, 206/391, 405, 406, 407, 408, 411, 419, 206/423, 424, 427, 431, 438, 439, 443, 206/445, 446, 449, 455, 456, 457, 460, 206/461, 462, 463, 464, 466, 467, 468, 206/469, 470, 471, 478, 482, 484, 486, 206/488, 489, 490, 493, 494, 497, 499, 206/501, 503, 508, 509, 511, 515, 518, 206/519, 521, 521.1, 521.8, 522, 523,
(Continued)

(56) References Cited

U.S. PATENT DOCUMENTS

2012/0085134 A1* 4/2012 Ezzo .................. E05B 73/0017 70/15

FOREIGN PATENT DOCUMENTS

CN 101310311 A * 11/2008 ........... E05B 45/005
CN 208907341 * 5/2019

(Continued)

*Primary Examiner* — Anthony D Stashick
*Assistant Examiner* — Marcos Javier Rodriguez Molina

(57) ABSTRACT

A box wrap security device includes a key, a connecting piece and a lock. The key is connected with the connecting piece through a steel wire and the connecting piece is connected with the lock through the steel wire. The lock includes an upper shell and a lower shell. The upper shell and the lower shell are locked with each other. A knob is embedded in the upper shell. A wire spool is fixedly connected to a bottom of the knob, and an alerter is connected between the knob and the wire spool. A limiting pin is inserted into a top socket of the lower shell. A first spring is sleeved on an upper end of the limiting pin. An upper end of the first spring is supported on a bottom of the upper shell.

8 Claims, 4 Drawing Sheets

(51) Int. Cl.
*G08B 13/12* (2006.01)
*G08B 13/24* (2006.01)

(58) Field of Classification Search
USPC ......... 206/524.1, 524.2, 524.3, 524.4, 524.6, 206/524.8, 525, 526, 528, 531, 532, 533, 206/534, 535, 536, 538, 539, 540, 542, 206/545, 559, 561, 562, 563, 564, 565, 206/566, 569, 570, 571, 575, 581, 583, 206/586, 591, 592, 593, 594, 597, 600, 206/705, 710, 711, 714, 719, 725, 730, 206/736, 738, 751, 754, 767, 769, 775, 206/776, 777, 778, 782, 783, 806, 807, 206/812, 815, 816, 817, 818, 820, 821, 206/822, 831, 832; 70/14, 15, 18, 20, 30, 70/32, 34, 41, 49, 53, 54, 55, 56, 57, 70/57.1, 58, 63, 64, 66, 68, 77, 91, 92, 70/101, 104, 106, 110, 129, 140, 158, 70/159, 160, 162, 163, 164, 165, 166, 70/167, 168, 169, 170, 171, 172, 174, 70/175, 176, 177, 178, 180, 183, 200, 70/203, 207, 208, 210, 212, 218, 223, 70/230, 231, 232, 233, 256, 257, 258, 70/263, 264, 266, 275, 276, 277, 278.7, 70/280, 282, 290, 312, 344, 346, 371, 70/375, 386, 387, 413, 416, 417, 422, 70/424, 428, 430, 431, 432, 434, 439, 70/441, 442, 465, 333 A, 38 A, 38 B, 70/DIG. 43, DIG. 56, DIG. 58; 109/3, 21, 109/25, 29, 31, 38, 39, 40, 41, 42, 43, 45, 109/47, 49, 50, 51, 52, 56, 58, 64, 67, 74, 109/76, 80, 82, 84, 59 R
See application file for complete search history.

(56) References Cited

FOREIGN PATENT DOCUMENTS

| | | | | | |
|---|---|---|---|---|---|
| CN | 208907341 | U | * | 5/2019 | ............. E05B 73/00 |
| EP | 2778327 | A2 | * | 9/2014 | ........... E05B 45/005 |
| JP | 2012038140 | A | * | 2/2012 | |
| WO | WO-2009103179 | A1 | * | 8/2009 | ........... E05B 45/005 |

* cited by examiner

BOX WRAP SECURITY DEVICE

TECHNICAL FIELD

The present disclosure relates to a field of alerters, in particular to a box wrap security device.

BACKGROUND

In real life, large shopping places, such as supermarkets and malls place great importance to the protection and anti-theft of goods sold. In general, a detection system using electronic article surveillance (EAS) technology is placed at an entrance or a cash register of the mall or the supermarket to identify and detect anti-theft soft tags attached to goods or reusable anti-theft hard tags attached to clothing, shoes and hats. When there is a tag that has not been processed by a staff (e.g., soft tag not degaussed or hard tag not removed), the detection system will raise an alarm to remind the staff.

However, for some goods, such as boxed goods, a petty thief sometimes opens a packaging box in the mall and pilfers a product in the packaging box. And because there are many people in the mall, it is difficult to ensure that customers do not open packaging boxes. In this case, there is a need for a device that not only prevents the petty thief from pilfering the product with the packaging box out of the mall, but also prevent the petty thief from opening the packaging box to directly pilfer the product inside.

SUMMARY

An object of the present disclosure is to provide a box wrap security device to solve above problems that for some products, such as boxed goods, sometimes a petty thief opens a packaging box in the mall and pilfers a product inside the packaging box.

To achieve the object, the present disclosure provides a box wrap security device. The box wrap security device includes a key, a connecting piece and a lock. The key is connected with the connecting piece through a steel wire and the connecting piece is connected with the lock through the steel wire. The lock includes an upper shell and a lower shell. The upper shell and the lower shell are locked with each other. A knob is embedded in the upper shell. A wire spool is fixedly connected to a bottom of the knob, and an alerter is connected between the knob and the wire spool. A limiting pin is inserted into a top socket of the lower shell, and a first spring is sleeved on an upper end of the limiting pin. An upper end of the first spring is supported on a bottom of the upper shell. A gear is arranged on a bottom of the wire spool along a circumferential direction of the wire spool. A through groove is arranged on a left side wall of the lower shell. A clamping plate is inserted in the through groove laterally, and a bottom of the limiting pin extends to an inner cavity of the through groove. Meshing teeth engaged with the gear are arranged on a right side wall of the clamping plate. Support columns are connected to a right side wall of the inner cavity of the clamping plate. And second springs are sleeved on an outer wall of the support columns. Third springs are connected to a front side and a rear side of the clamping plate. And a right end of the third springs is propped on an arc-shaped plate in the lower shell. When the key is inserted into the clamping plate, the key abuts against a bottom surface of the limiting pin and drives the limiting pin to move upward. When the key is inserted to a predetermined position, the limiting pin moves downward to limit a position of the key, so that the key is unable to be pulled out from the clamping plate. And the key compresses the second springs to push the clamping plate make the meshing teeth on the clamping plate to be engaged with the gear, such that the gear only able to rotate in one direction. And when the gear rotates, the gear drives the wire spool to rotate to drive the steel wire to wind.

Furthermore, the upper shell and the lower shell are polyethylene shells, and the upper shell and the lower shell are connected by ultrasonic welding, which prevents artificial opening.

Furthermore, slots are arranged on four corners on the bottom of the knob, and fixture blocks arranged on four corners on a top of the wire spool are engaged with the slots.

Furthermore, wherein the alerter is a magnetic alerter.

Furthermore, elastic force of the second springs is greater than elastic force of the third springs. When the key is inserted into the clamping plate, the key tightly compresses the second springs, and the third springs are compressed to abut against the wire spool to make the meshing teeth on the clamping plate to be engaged with the gear.

Furthermore, a lock hole is disposed on the key. When the key is inserted to the predetermined position, the limiting pin moves downward and is received in the lock hole to limit the position of the key.

Furthermore, the limiting pin is made of ferromagnetic material. The box wrap security device further includes a magnetic unlocker. A recess is disposed on the upper shell, when unlock the box wrap security device, the magnetic unlocker is placed on the recess.

Furthermore, when unlocking, a magnetic unlocker magnetically attracts the limiting pin to move upward; the position of the key is no longer limited by the limiting pin. And the second springs relax and drive the key to be ejected from the clamping plate, the third springs relaxes and drive the clamping plate to move, such that the meshing teeth of the clamping plate are not engaged with the gear. And the gear is able to rotate in bi-directions to make the wire spool to rotate in bi-directions The present disclosure provides the alerter and a double-spring gear lock mechanism at the bottom to prevent the goods from being taken out from the mall by cooperation of the steel wire. At the same time, since the steel wires is tightly bound to the packaging box, it effectively prevents petty thieves from opening the packaging box and taking out the product inside from the mall.

DETAILED DESCRIPTION

Technical solution in embodiments of the present disclosure will be clearly and completely described with reference to the drawings in the embodiments of the present disclosure. Obviously, the described embodiments are only a part of the embodiments of the present disclosure, but not all the embodiments. Based on the embodiments of the present disclosure, other embodiments obtained by those skilled in the art without creative efforts shall fall within the protection scope of the present disclosure.

Figure 1:
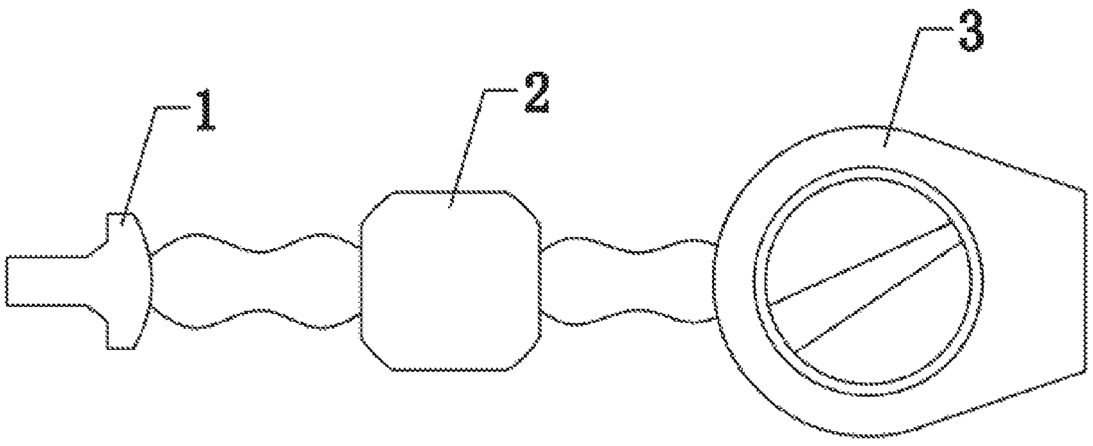
FIG. 1 is a schematic diagram showing a structure of the present disclosure.
Figure 2:
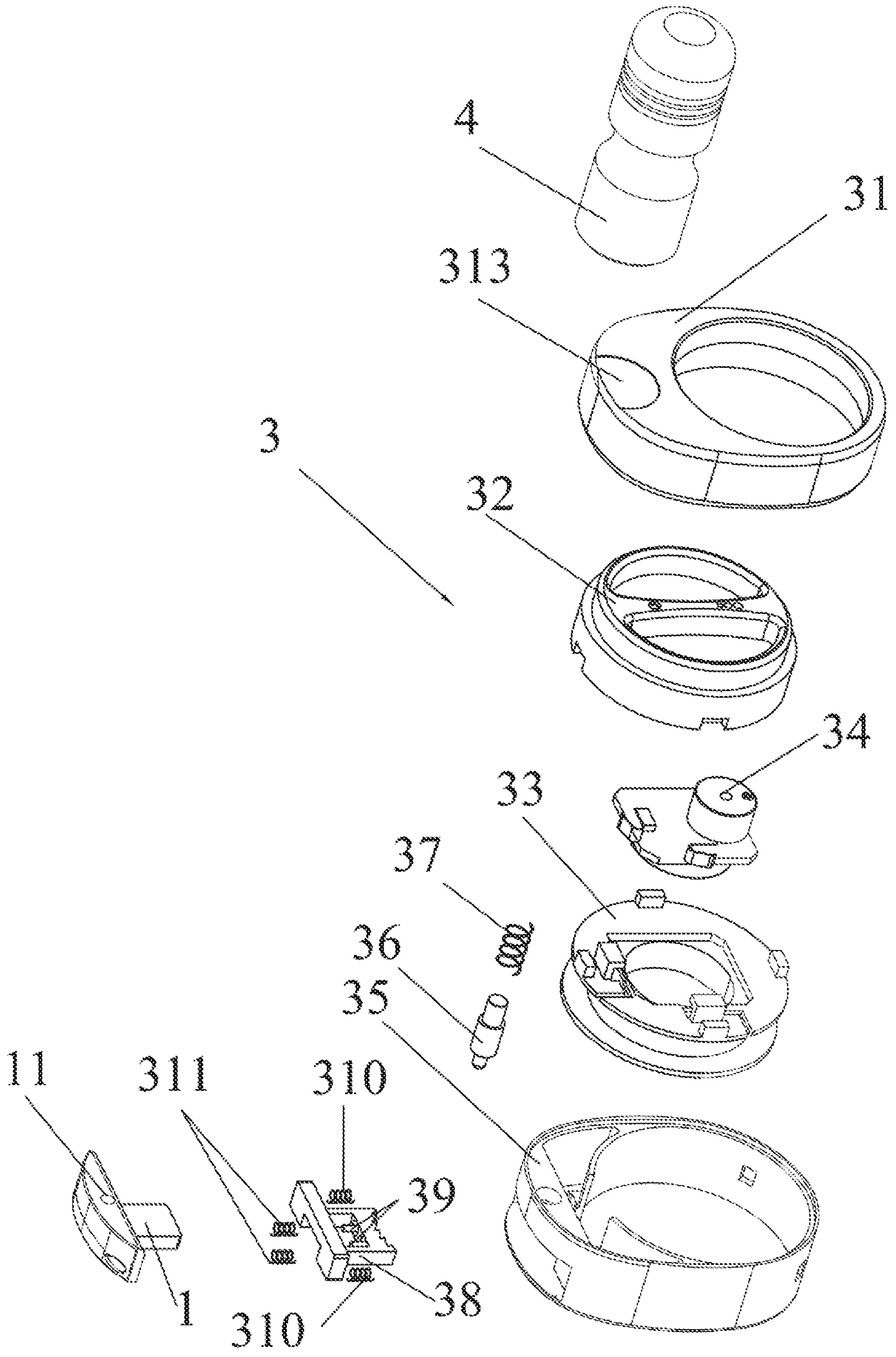
FIG. 2 is an exploded view of a box wrap security device of the present disclose.
Figure 3:
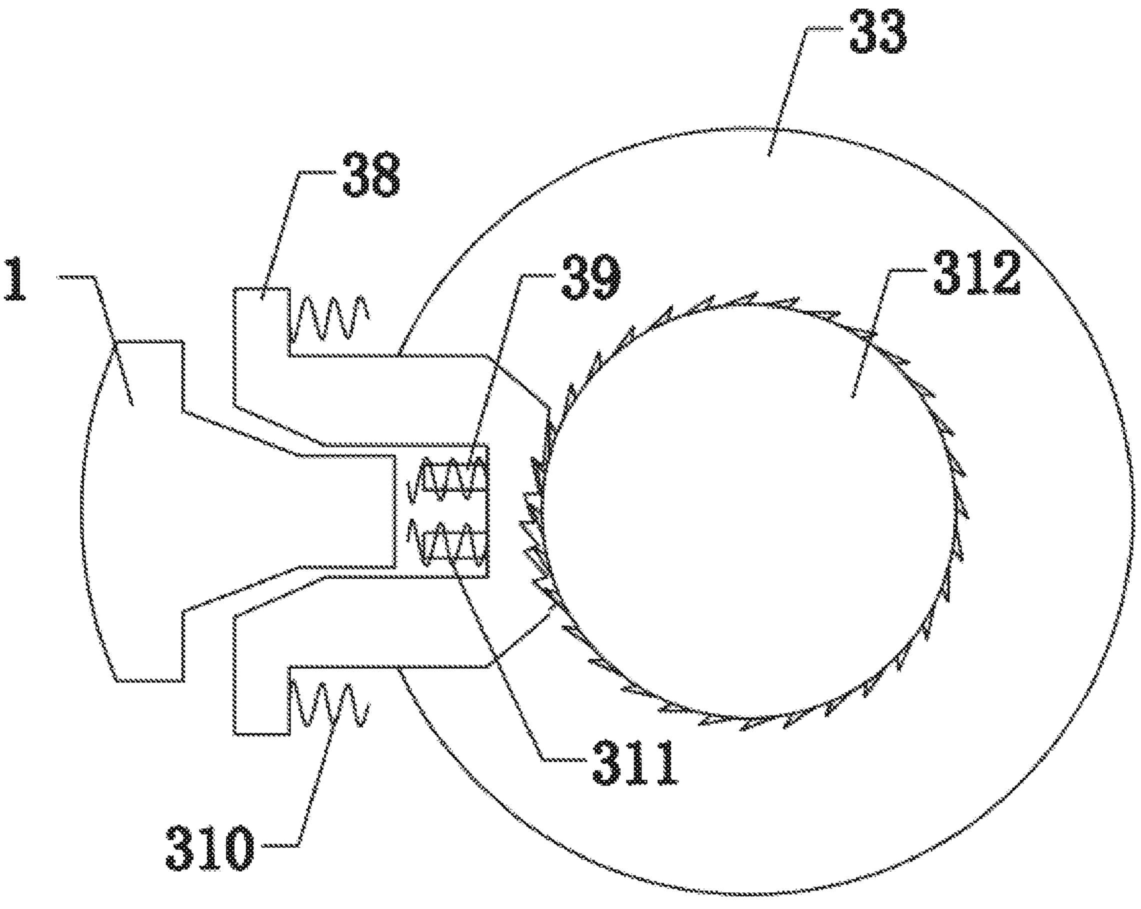
FIG. 3 is a bottom view of a wire spool of the present disclosure.
Figure 4:
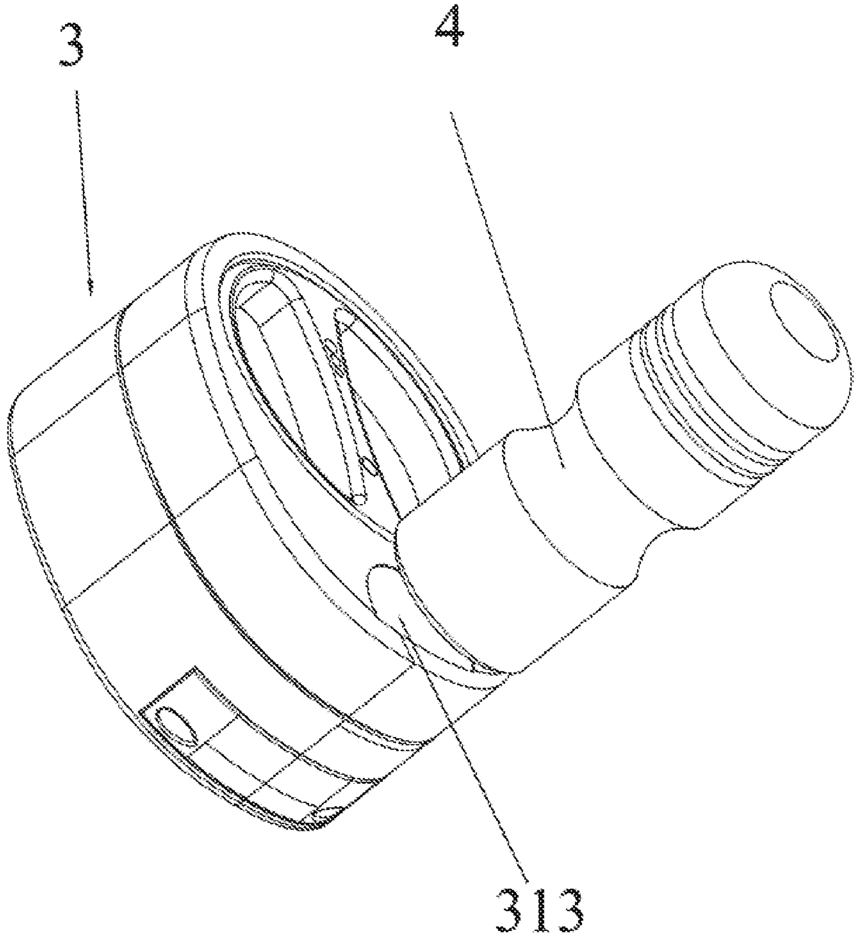
FIG. 4 is a schematic diagram showing a structure of the present disclosure where a magnetic unlocker is placed on a recess

As shown in FIGS. 1-3, the present disclosure provides a box wrap security device. The box wrap security device includes a key 1, a connecting piece 2, and a lock 3. The key 1 is connected with the connecting piece 2 through a steel wire and the connecting piece 2 is connected with the lock 3 through the steel wire. The lock 3 includes an upper shell 31 and a lower shell 35. The upper shell 31 and the lower shell 35 are locked with each other. A knob 32 is embedded in the upper shell 31. A wire spool 33 is fixedly connected to a bottom of the knob 32. And an alerter 34 is connected between the knob 32 and the wire spool 34. A limiting pin 36 is inserted into a top socket of the lower shell 35. A first spring 37 is sleeved on an upper end of the limiting pin 36. An upper end of the first spring 37 is supported on a bottom of the upper shell 31. A gear 312 is arranged on a bottom of the wire spool 34 along a circumferential direction of the wire spool 34. A through groove is arranged on a left side wall of the lower shell 35. A clamping plate 38 is inserted in the through groove laterally. A bottom of the limiting pin 36 extends to an inner cavity of the through groove. Meshing teeth 381 engaged with gear are arranged on a right side wall of the clamping plate 38. Support columns 39 are connected to a right side wall of the inner cavity of the clamping plate 38. And second springs 311 are sleeved on an outer wall of the support columns 39. Third springs 310 are connected to a front side 382 and a rear side 383 of the clamping plate 38. And a right end of the third springs 310 is propped on an arc-shaped plate 351 in the lower shell 35. When the key 1 is inserted into the clamping plate 38, the key 1 abuts against a bottom surface of the limiting pin 36 and drives the limiting pin 36 to move upward. When the key 1 is inserted to a predetermined position, the limiting pin 36 moves downward to limit a position of the key 1. And the key 1 is unable to be pulled out from the clamping plate 38. And the key 1 compresses the second springs 311 to push the clamping plate 38 and make the meshing teeth on the clamping plate 38 to be engaged with the gear 312, such that the gear 312 only able to rotate in one direction. When the gear 312 rotates, the gear 312 drives the wire spool 33 to rotate to drive the steel wire to wind. In the embodiment, the predetermined position is where the second springs 311 are fully compressed. When the meshing teeth on the clamping plate 38 are engaged with the gear 312, the gear 312 is only able to rotate in one direction, such as clockwise or counterclockwise, in this embodiment, the gear 312 rotates in the counterclockwise direction. However, the present disclosure is not limited thereto.

In one embodiment, the upper shell 31 and the lower shell 35 are polyethylene shells, which are lightweight and easy to form. The upper shell 31 and the lower shell 35 are welded together by ultrasound to prevent them from being disassembled. Slots are arranged on four corners on the bottom of the knob 32, and fixture blocks arranged on four corners on a top of the wire spool 33 are engaged with the slots, which act as inter locks and make the lock 3 easy to disassemble. The alerter 34 is a magnetic alerter, which is able to meet requirements of ordinary malls. In this embodiment, if a good is taken out of the protection area (e. g., a shopping mall), an external wireless detection device provided at an entrance or an exit of the protection area detects that the magnetic alerter is not demagnetized, and the wireless detection device sends out an alarm signal, and the wireless detection device sends out an alarm (e. g., light or sound). Or when the steel wire is damaged and broken, the magnetic alerter itself triggers an alarm, which emits a flashing light and high-decibel alarm sound.

In one embodiment, elastic force of the second springs 311 is greater than elastic force of the third springs 310. When the key 1 is inserted into the clamping plate 38, the key 1 tightly compress the second springs 311, and the third springs 310 are compressed to abut against the wire spool 33 to make the meshing teeth on the clamping plate 38 to be engaged with the gear 312. If the elastic force of the second springs 311 is smaller than elastic force of the third springs 310, the key 1 is unable to make the clamping plate 38 to abut against the wire spool 33 by the force of the second springs 311, resulting in a defective product.

In one embodiment, a lock hole 11 is disposed on the key 1; when the key 1 is inserted to the predetermined position, the limiting pin 36 moves downward and is received in the lock hole 11 to limit the position of the key 1. In this embodiment, a size and shape of the lock hole 11 matches with a size and shape of the limiting pin 36, so that the lock hole 11 limits a position of the limit pin 36 to avoid slight displacement of the limiting pin 36.

In one embodiment, the limiting pin 36 is made of ferromagnetic material, such as iron or nickel, which can be attracted to the magnet or the limiting pin 36 is made of magnet. The box wrap security device further includes a magnetic unlocker 4. A recess 313 is disposed on the upper shell (31), when unlock the box wrap security device, the magnetic unlocker 4 is placed on the recess 313. In the embodiment, the recess 313 is disposed directly over the limiting pin 36.

In one embodiment, when unlocking, the magnetic unlocker 4 magnetically attracts the limiting pin 36 to move upward; the position of the key 1 is no longer limited by the limiting pin 36, and the second springs 311 relax and drive the key 1 to be ejected from the clamping plate 38, the third springs 310 relaxes and drive the clamping plate to move 38, such that the meshing teeth of the clamping plate 38 are not engaged with the gear 312; and the gear 312 is able to rotate in bi-directions to make the wire spool 33 to rotate in bi-directions. At this time, the steel wire is able to be wound and unwound according to the rotation direction of the wire spool 33. Moreover, in this embodiment, when placed on the recess 313, the suction force of the magnetic unlocker 4 is greater than the elastic force of the first spring 37, otherwise the magnetic unlocker 4 is unable to disengage the limiting pin 36 from the lock hole 11.

The limiting pin 36 is made of the ferromagnetic material, when the key 1 is inserted into the clamping plate 38, the limiting pin 36 is first pushed up by the key 1 and then inserted into the lock hole 11 on the key 1, such that the key 1 is locked in the clamping plate 38, and the key 1 cannot be pulled out. Meanwhile, the key 1 pushes the support columns 39 and the clamping plate 38 through the second springs 311, and makes the meshing teeth on the right side wall of the clamping plate 38 in close contact with the gear 312. The gear 312 is a gear with a certain angle, therefore the gear 312 is locked in one direction by cooperation of the meshing teeth. At this time, the gear 312 is able to rotate in one direction only, thereby tightening the wire harness. At the same time, an LED indicator flashes on the alerter to enter an armed state.

When unlocking the box wrap security device, the limiting pin 36 is sucked upward by the external dedicated unlocking device, e. g., the magnetic unlocker 4. So that the key 1 smoothly pops up. At this time, the third springs 310 push the clamping plate 38 back, so that the gear 312 rotates in either left direction or right direction.

Although the embodiments of the present disclosure have been shown and described, it will be understood by those skilled in the art that various changes, replacements, and modifications can be made to these embodiments without departing from the principle and spirit of the present disclosure, the scope of the present disclosure is defined by the appended claims and their equivalents. The scope of the present disclosure is defined by the following claims and their equivalents.

What is claimed is:

1. A box wrap security device comprising:

a key (1), a connecting piece (2); and a lock (3);

wherein the key (1) is connected with the connecting piece (2) through a steel wire and the connecting piece (2)) is connected with the lock (3) through the steel wire; the lock (3) comprises an upper shell (31) and a lower shell (35); the upper shell (31) and the lower shell (35) are locked with each other; a knob (32) is embedded in the upper shell (31); a wire spool (33) is fixedly connected to a bottom of the knob (32), and an alarm (34) is connected between the knob (32) and the wire spool (33);

wherein a limiting pin (36) is inserted into a top socket of the lower shell (35); a first spring (37) is sleeved on an upper end of the limiting pin (36); an upper end of the first spring (37) is supported on a bottom of the upper shell (31); a gear (312) is arranged on a bottom of the wire spool (33) along a circumferential direction of the wire spool (33); a through groove is arranged on a left side wall of the lower shell (35); a clamping plate (38) is inserted in the through groove laterally; a bottom of the limiting pin (36) extends to an inner cavity of the through groove; meshing teeth engaged with gear (312) are arranged on a right side wall of the clamping plate (38); support columns (39) are connected to a right side wall of the inner cavity of the clamping plate (38), and second springs (311) are sleeved on an outer wall of the support columns (39); third springs (310) are connected to a front side and a rear side of the clamping plate (38), and a right end of the third springs (310) is propped on an arc-shaped plate in the lower shell (35); when the key (1) is inserted into the clamping plate (38), the key (1) abuts against a bottom surface of the limiting pin (36) and drives the limiting pin (36) to move upward; when the key (1) is inserted to a predetermined position, the limiting pin (36) moves downward to limit a position of the key (1); the key (1) is unable to be pulled out from the clamping plate (38); and the key (1) compresses the second springs (311) to push the clamping plate (38) and make the meshing teeth on the clamping plate (38) to be engaged with the gear (312), such that the gear (312) only able to rotate in one direction; and when the gear (312) rotates, the gear (312) drives the wire spool (33) to rotate to drive the steel wire to wind;

wherein the limiting pin (36) is made of ferromagnetic material; the box wrap security device further comprises a magnetic unlocker (4); a recess (313) is disposed on the upper shell (31), when unlock the box wrap security device, the magnetic unlocker (4) is placed on the recess (313).

2. The box wrap security device according to claim 1, wherein the upper shell (31) and the lower shell (35) are polyethylene shells, and the upper shell (31) and the lower shell (35) are welded together by ultrasound.

3. The box wrap security device according to claim 1, wherein slots are arranged on four corners on the bottom of the knob (32); and fixture blocks arranged on four corners on a top of the wire spool (33) are engaged with the slots.

4. The box wrap security device according to claim 1, wherein the alarm (34) is a circuit board with an alarm function.

5. The box wrap security device according to claim 1, wherein elastic force of the second springs (311) is greater than elastic force of the third springs (310), when the key (1) is inserted into the clamping plate (38), the key (1) tightly compress the second springs (311), and the third springs (310) are compressed to abut against the wire spool (33) to make the meshing teeth on the clamping plate (38) to be engaged with the gear (312).

6. The box wrap security device according to claim 1, wherein a lock hole (11) is disposed on the key (1); when the key (1) is inserted to the predetermined position, the limiting pin (36) moves downward and is received in the lock hole (11) to limit the position of the key (1).

7. The box wrap security device according to claim 1, when unlocking, the unlocker (4) magnetically attracts the limiting pin (36) to move upward; the position of the key (1) is no longer limited by the limiting pin (36), and the second springs (311) relax and drive the key (1) to be ejected from the clamping plate (38), the third springs (310) relaxes and drive the clamping plate to move (38), such that the meshing teeth of the clamping plate (38) are not engaged with the gear (312); and the gear (312) is able to rotate in bi-directions to make the wire spool (33) to rotate in bi-directions.

8. The box wrap security device according to claim 1, wherein the when placed on the recess (313), a suction force of the magnetic unlocker (4) is greater than the elastic force of the first spring (37).

* * * * *